(12) United States Patent
Wrage (10) Patent No.: US 7,546,813 B2
(45) Date of Patent: Jun. 16, 2009

(54) POSITIONING DEVICE FOR A FREE-FLYING KITE-TYPE WIND-ATTACKED ELEMENT IN A WIND-POWERED WATERCRAFT

(75) Inventor: Stephan Wrage, Hamburg (DE)

(73) Assignee: Skysails GmbH & Co. KG, Hamburg (DE)

( * ) Notice: Subject to any disclaimer, the term of this patent is extended or adjusted under 35 U.S.C. 154(b) by 0 days.

(21) Appl. No.: 11/578,817

(22) PCT Filed: Apr. 19, 2005

(86) PCT No.: PCT/EP2005/004183

§ 371 (c)(1),
(2), (4) Date: Oct. 19, 2006

(87) PCT Pub. No.: WO2005/100147

PCT Pub. Date: Oct. 27, 2005

(65) Prior Publication Data

US 2007/0272141 A1    Nov. 29, 2007

(30) Foreign Application Priority Data

Apr. 19, 2004    (DE) .................. 10 2004 018 838

(51) Int. Cl.
*B63H 9/06*    (2006.01)
(52) U.S. Cl. .................................. 114/102.1
(58) Field of Classification Search ............... 114/39.11, 114/39.21, 39.29, 102.1, 102.2; 244/155 A
See application file for complete search history.

(56) References Cited

U.S. PATENT DOCUMENTS

| 2,433,344 | A | | 12/1947 | Crosby |
| 3,180,090 | A | * | 4/1965 | Hawley et al. ................. 60/444 |
| 4,102,291 | A | * | 7/1978 | Sebald ........................ 114/244 |
| 4,497,272 | A | | 2/1985 | Veazey |
| 5,271,351 | A | * | 12/1993 | Horiuchi et al. .............. 114/106 |
| 5,642,683 | A | | 7/1997 | Bedford |
| 6,254,034 | B1 | | 7/2001 | Carpenter |
| 6,616,402 | B2 | | 9/2003 | Selsam |
| 6,918,346 | B2 | * | 7/2005 | Grenier .................. 114/102.16 |

(Continued)

FOREIGN PATENT DOCUMENTS

DE    3817073    12/1988

(Continued)

OTHER PUBLICATIONS

J. F. Wellicome et al, "Ship Propulsive Kites—An initial Study," *University of Southhampton*, ISSN 0140 3818 SSSU 19, pp. i-71.

*Primary Examiner*—Ed Swinehart
(74) *Attorney, Agent, or Firm*—Alix, Yale & Ristas, LLP (57) ABSTRACT

Disclosed is a positioning device for a free-flying kite-type wind-attacked element that comprises a profiled wing, is used as the exclusive, an auxiliary, or an emergency drive unit, and is connected to a watercraft via a traction rope. The positioning device is provided with a winch that can cause the traction rope to be taken in when a given first tractive force is not attained and/or when the flow is about to stop or has stopped abruptly and/or cause the traction rope to be veered when given a second tractive force and/or a given inflow velocity are/is exceeded.

20 Claims, 5 Drawing Sheets

U.S. PATENT DOCUMENTS

2002/0139603 A1    10/2002  Aiken et al.
2007/0157868 A1 *   7/2007  Wrage et al. ................. 114/365
2007/0250226 A1 * 10/2007  Wrage et al. .................. 701/21

FOREIGN PATENT DOCUMENTS

| | | |
|---|---|---|
| FR | 2 781 195 | 1/2000 |
| GB | 2 098 946 A | 12/1982 |
| GB | 2 098 950 A | 12/1982 |
| GB | 2 098 952 | 12/1982 |
| GB | 2 294 666 | 5/1996 |
| WO | WO 02/079030 A1 * | 10/2002 |
| WO | WO 03/097448 | 11/2003 |

* cited by examiner

POSITIONING DEVICE FOR A FREE-FLYING KITE-TYPE WIND-ATTACKED ELEMENT IN A WIND-POWERED WATERCRAFT

BACKGROUND OF THE INVENTION

The invention relates to a positioning apparatus for a freely flying kite-like element on which wind acts for a watercraft with wind propulsion.

A positioning apparatus such as this is known from U.S. Pat. No. 2,433,344. However, this does not relate to a winch which is suitable for adjustment of an element on which wind acts, in accordance with the wind conditions, for a watercraft with wind propulsion, but relates only to keeping a general aeronautical object at a constant height. It is not possible to adjust the known apparatus on the basis of the wind conditions.

SUMMARY OF THE DISCLOSURE

A positioning apparatus of the generic type indicated initially which does not have the stated disadvantage allows the position of the element on which wind acts to be adapted automatically in accordance with the wind conditions.

A positioning apparatus for a freely flying kite-like element on which wind acts, having a wing profile as the exclusive drive, as an auxiliary drive or as an emergency drive, which is connected via a hawser to a watercraft, in particular to a sea-going vessel, can be achieved advantageously by in each case matching the length of the hawser to the atmospheric conditions. If automatic paying-out and pulling-in are intended to be provided, then the limit force for paying out is set to be higher than the limit force for pulling in, thus resulting in stable operation without control oscillations.

One particularly advantageous feature is that this at the same time avoids overloading of the hawser since the load limit at which paying out takes place is preferably chosen such that it is well within the load tolerance of the hawser.

It is also advantageous for further means to be provided which initiate a pulling-in or paying-out process only when the undershooting, overshooting or flow separation last for a predetermined time period, which may if required be defined differently for each function direction, since this avoids excessively frequent pulling-in and paying-out. The time periods are in this case preferably in the region of a few seconds.

In another preferred embodiment, the output signal from a sensor for imminent flow separation is supplied to a converter which drives a winch located on board the watercraft in order to shorten the hawser in such a manner that the incident flow on the element on which wind acts is increased to such an extent that the lift of the element on which wind acts is sufficient in order to at least keep it in the air. In this case, the winch speed can be set for pulling in to a fixed minimum value which guarantees an incident-flow speed which is sufficient for the element on which wind acts to fly in a stable manner. Alternatively, it is possible to define a minimum stress for the hawser. If this is undershot, the winch starts and ensures in this way that the incident flow on the element on which wind acts is maintained. As soon as a defined stress is exceeded as a consequence of this, the winch is stopped again, resulting in the normal flight state. This results in simple winch control, which is dependent on two pulling-force threshold values.

In a further advantageous embodiment of the positioning apparatus, when the incident flow or pulling force once again exceeds a predetermined further threshold value—which is below that value at which paying-out must take place in any case, the length of the hawser is gradually increased again until it has reached essentially the same length as before it was shortened.

Furthermore, it is possible to provide in a preferred manner for the winch to have a predetermined torque/cable-length characteristic around the selected cable length, which results in cable shocks being absorbed. This measure is distinguished in that dynamic loads on the element on which wind acts and on the hawser can be reduced. This can be achieved by the torque/cable-length characteristic having a progressive moment, that is to say the greater the amount of cable that is fed out, the greater the winch resistance becomes. With a characteristic such as this, a wind surge acting on the element on which wind acts first of all results in a large amount of cable being paid out quickly, but then in the system being braked smoothly.

In order to ensure safe stowage of the element on which wind acts, it is also advantageous for the wind speed during stowage to ensure the minimum incident-flow speed on the element on which wind acts to maintain its flying capability when loaded by the hawser.

Furthermore, means are provided which result in the element on which wind acts being pulled in automatically in response to particular criteria, when the wind speed is less than is required to maintain its flying capability when loaded by the hawser or when, on the basis of navigational data, there is a risk of a collision with an object under the water, in the water, on the land or in the air within a time period which is less than or equal to the time which is required for the element on which wind acts to be pulled in, as a minimum, at the maximum winch speed. This also applies when navigational restrictions threaten to prevent the guidance of the element on which wind acts.

In order to make use of higher wind speeds at greater altitudes, it is advantageous for the process of paying out the cable by a predetermined additional length amount to be in each case initiated when the minimum incident-flow speed has not been undershot as soon as within a predetermined time interval, or a weather signal is received or is determined which indicates an increased wind speed or a wind direction which will assist travel in the course direction, and this length is maintained provided that the cable pull does not fall down when the additional cable length is deployed. This results in the cable being paid out when the conditions are constant, in order to attempt to guide the element on which wind acts at a greater altitude.

In another advantageous development, the pulling-in process and the paying-out process are carried out, particularly in a relatively high sea state, in such a manner that undesirable vessel movements (rolling, pitching, yawing) are reduced. The pulling-in and paying-out processes are thus carried out with a phase shift with respect to the component of the vessel movements in the cable direction, so that, to this extent, this on the one hand reduces the vessel movements while on the other hand also ensuring stable guidance on the element on which wind acts, since the forces acting on the hawser are reduced.

It is evident that, in contrast to the prior art, a large number of measures are taken which allow fully automatic guidance of an element on which wind acts as a propulsion element which must be guided at different altitudes.

In order to satisfy the stringent requirements to which a winch is subject, in particular with respect to power consumption, force and reaction time, it is also advantageous for the winch to be driven by a pressure medium, with the winch drive in particular being in the form of a variable-volume hydraulic pump. This makes it possible to comply with safety requirements which—for example on tankers—restrict the use of electrical drives owing to the existing risk of fire.

In order to ensure safe stowage even in emergency, an emergency set is provided for operation of the winch, which ensures that the power required to operate the winch is available even if the primary energy source fails.

One particularly advantageous feature is the fact that the forces for variation of the element on which wind acts need be transmitted only over short distances, allowing precise settings, not least because precise transmission of the control commands for operation over long pulling lines is not possible just because of the strains on them.

Furthermore, the element on which wind acts is not subject to any risk of the lines becoming tangled with one another and becoming incapable of maneuvering. Specifically, it must be remembered that the correct setting and guidance of the element on which wind acts is also of considerable importance to the watercraft overall since, for example, a maneuver to change the direction of travel must always also result in readjustment of the element on which wind acts. If, for example, lines were to be crossed over or tangled in this case, it would either not be possible to carry out the direction change, or the element on which wind acts would have to be cut off.

It is also advantageous for the operating elements and the means for force production to be provided in the immediate vicinity of the element on which wind acts, and the corresponding control devices can also at least partially be provided there immediately adjacent to the element on which wind acts, so that it is also possible to largely dispense with complex signal transmission paths, which are susceptible to disturbances.

All of the aerodynamic controls, such as flaps, control surfaces, as well as the change in its alignment, the pitch angle and/or shape are included in the variation of the aerodynamic effect of the element on which wind acts.

In this case, the shape can preferably be varied by symmetrical or asymmetric variation of the wing profile by influencing the alignment of its flow separation edge, by twisting of the wing profile, by symmetrical and/or by asymmetric variation of the curvature of the wing profile and/or by variation of the point of attachment of the hawser. In other advantageous developments, the aerodynamic characteristics can also be varied by variation of the geometry of the wing profile, as is manifested in the cross section of the kite or of its curvature. A shape variation such as this in the case of a two-layer wing profile advantageously comprises variation of the distance between the two layers by means of appropriate elements.

For weight reasons, it may be advantageous to use a single drive element for operation on both sides and/or in opposite senses for variation of the wing profile in the same sense or asymmetrically. In this case, by way of example, two ailerons are each operated in opposite senses, with the neutral position forming the mid-position of the two control surfaces.

In the case of an element on which wind acts which is composed of textile material, for example as represented by a kite in the form of a paraglider, the aerodynamic effect is preferably varied by adjustment or by lengthening or shortening of at least one control line by means of the drive element.

In order to match the forces to be applied for aerodynamic adjustments, it may be advantageous for at least one control line to have at least one bend or feedback area in the form of a pulley block, in which case the pulley block can be used both to step-up the ratio or to reduce it.

If the control lines form a matrix-like arrangement, this makes it easier to influence a kite in the manner of a paraglider. In this case, this arrangement relates to an area underneath the kite, from which the aerodynamic operations can be carried out jointly. In this case, it is advantageous for different control lines each to be driven in a combined form via a jointly driven operating element, since this reduces the number of drive elements. The jointly driven operating element may in this case, by way of example, comprise an element that is mounted such that it can rotate, a rocker, a lever, a toothed-belt pulley disk or the like, which is moved jointly via a drive motor. The individual control lines then lead to differently selected attachment points on the common operating element, so that the respective linear movement results from the geometry of the attachment point, with the relevant control line being moved by this linear movement. In this case, the individual control lines may also be stepped up or reduced by means of pulley blocks or the like. This then results in the movement of the operating element being converted to the desired geometry change of the overall element on which wind acts, or of parts of it.

In another advantageous embodiment, the drive element comprises an electric winch and/or a linear actuator, with the linear actuator being formed by a pneumatic element which expands in the lateral direction when increased pressure is applied, thus shortening its length, or vice versa. Elements such as these are known as "artificial muscles", and are preferably driven pneumatically.

In order to obtain power for the control operations on the element on which wind acts, it is advantageous for a wind turbine to be provided in a container which is provided in the vicinity of the element on which wind acts and is clad in a streamlined manner, and which acts as an electrical generator, which then charges an electrical energy store. If pneumatic elements are used as actuators, it is also possible to provide a turbine which drives a downstream compressor which then supplies the increased pressure for the pneumatic elements. In this case, a pressure reservoir is used as the energy store.

The means for controlling the element on which wind acts are also accommodated in the container which is provided in the vicinity of the element on which wind acts, and these means produce output signals for actuation of the drive elements (actuators). In this case, in particular, means are provided in order to determine a control signal for the drive element from a signal for the course of the vessel, the wind direction and/or the wind speed.

It is advantageous for the control to be based on the direction and the speed of the apparent wind at the element on which wind acts, since its alignment is determined in this way.

The element on which wind acts is preferably controlled by an autopilot apparatus, with a sensor element being provided which is followed by at least one converter element, which is preferably in the form of an accelerometer and at least indirectly emits a control signal to the drive element. A further sensor element emits an output signal with respect to its position and alignment in three dimensions which, in particular, is related to the position of the vessel.

If a different sensor element is provided, which indicates imminent flow separation or flow separation that has already occurred, or is in the form of an element provided in the area of that surface of the element on which wind acts around which the flow passes and which emits an output signal when the airflow is attached to it, the flight control can be designed such that this prevents the element on which wind acts from dropping in the event of stalling.

It has also been found to be advantageous for means to be provided in order to produce a control signal for three-dimensional alignment of the element on which wind acts or for the maneuver figures externally by means of an on-board unit which is connected to the watercraft. Furthermore, signal transmission means are advantageously provided in order to transmit the third control signal from the on-board unit to the autopilot apparatus, in which case this control signal is preferably a differential-GPS or some other navigation signal, which includes information about the position of the element on which wind acts with respect to the watercraft.

If additional storage means and comparator means are provided which allow storage of signals associated with previous times together with signals which appear at later times, in such a manner that successive maneuver states can be compared, it is possible to provide predictive control of the element on which wind acts in the sense that the predictable consequences for vessel operation are taken into account on initiation of a maneuver.

In one other advantageous embodiment, the drive element and/or the sensor element are/is provided in the container which also forms the attachment point for the hawser and from which holding lines and control lines originate, to which the element on which wind acts is connected. This container is preferably designed to be streamlined and may also have a wind turbine for energy production for aerodynamic control of the element on which wind acts.

The described invention is particularly suitable for seagoing vessels or those which travel in high-seas areas.

In one advantageous application for energy generation, a generator is provided which is driven by the flow of the water, in particular via a vessel propeller or turbine, and supplies the electrical energy that is generated to an energy store, in particular to a hydrogen generator. The hydrogen obtained by electrolytic splitting of the water is stored, and is held in a reservoir.

Further preferred exemplary embodiments are specified in the dependent claims.

One advantageous exemplary embodiment is illustrated in the figures and will be described in the following text. In this case, the element on which wind acts according to the invention is also referred to synonymously, for short, as a "kite". However, the expression "wing" is also correct, because this is an airborne appliance with a wing function.

BRIEF DESCRIPTION OF THE DRAWINGS

One advantageous exemplary embodiment is illustrated in the figures, in which:

FIG. 1 shows an oblique plan view of a vessel which is being towed by the kite system, FIG. 1$a$ shows a coordinate system which is used as the reference system for the following description, FIG. 1$b$ shows one exemplary embodiment of the element on which wind acts according to the invention, in the form of a paraglider.

DETAILED DESCRIPTION OF THE PREFERRED EMBODIMENTS

Figures 1, 1A:
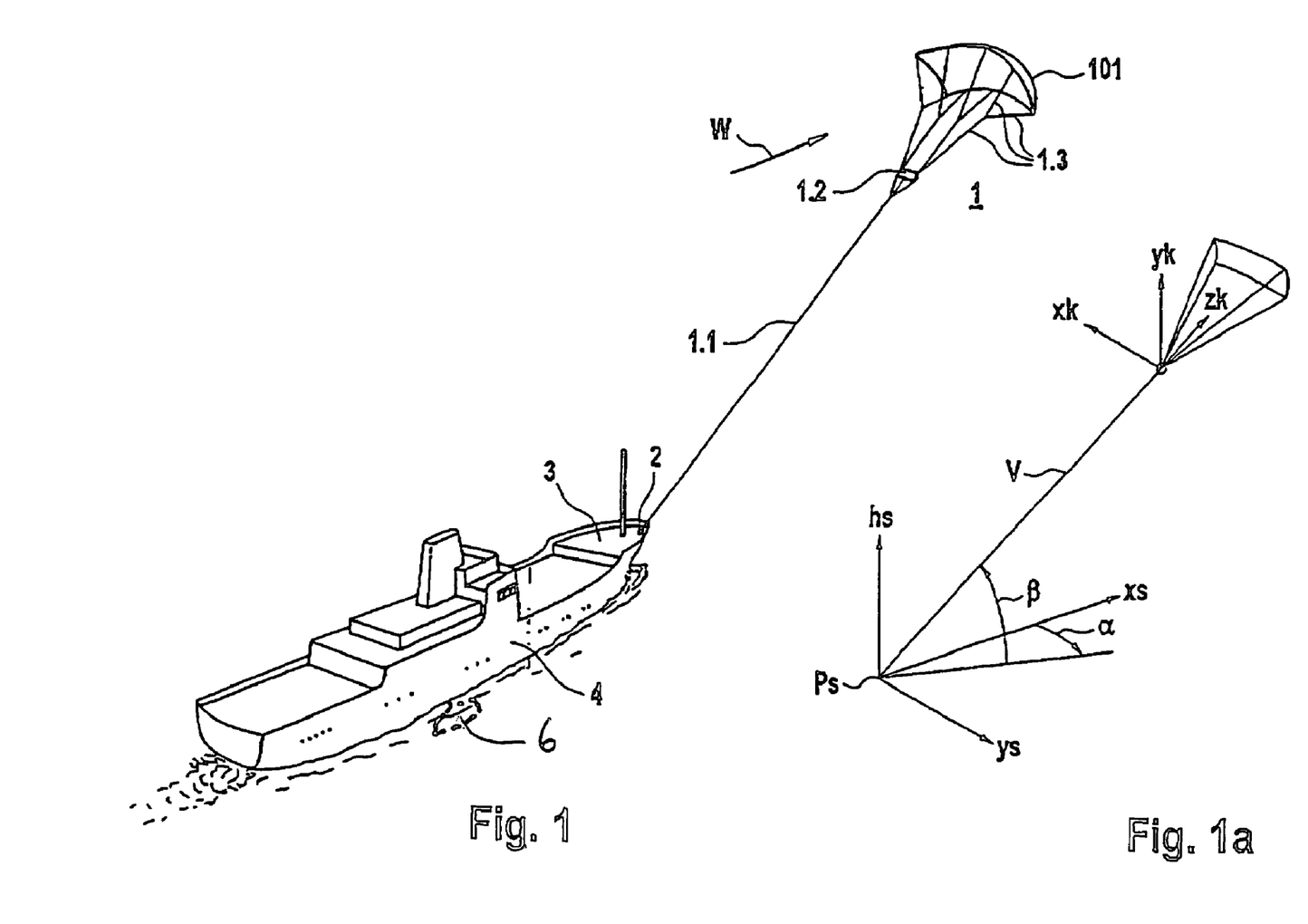

FIG. 1 shows an oblique plan view of a vessel which is being towed by the kite system. In this case, an element 1 on which wind acts is connected to a vessel 4 via a hawser 1.1 with an apparatus 2 on which force acts and which is provided in the bow area of the vessel 4. The hawser 1.1 is passed to a central gondola 1.2, from which a number of holding lines 1.3 originate, which are passed to, the element 1 on which wind acts and is in the form of a paraglider with a kite profile, giving it the necessary shape. The details relating to this will be explained further below in the description. The apparent wind direction in the area of the element 1 on which wind acts is annotated W. The corresponding wind vector is indicated by its magnitude and direction. If required, its rate of change is also indicated by a variable B, which denotes the gusting, forms the mean time discrepancy between the wind speed and its mean value and can be represented as a scalar, which effectively forms the radius of a sphere around the tip of the wind vector W.

A generator 6 is provided which is driven by the flow of the water. The generator supplies the electrical energy to an energy store, in particular to a hydrogen generator. The hydrogen obtained by the electrolytes splitting of the water is stored and held in a reservoir.

FIG. 1$a$ shows a coordinate system which is used as the reference system in the following description. In this case, $x_s$ indicates the direction of travel of the vessel, and $y_s$ is the direction at right angles to the direction of travel. In this case, the coordinate system should be regarded as being firmly linked to a point $P_s$ on the vessel. This point is preferably the point 2 at which force acts in the bow area. The height $h_s$ in this case corresponds to the direction of the axis z of the conventional coordinate system, and indicates the height above the reference point $P_s$. This reference point is preferably the location at which the GPS antenna of an on-board GPS appliance is fitted, so that the coordinates of a point away from $P_s$, at which another GPS appliance is located, can be produced by subtraction of the coordinates emitted from the two appliances. (If the GPS antenna of the on-board GPS appliance is located at a distance away from the reference point $P_s$, then this could be taken into account by addition of a fixed coordinate difference.)

For simplicity, the following description is based on the assumption of a polar coordinate system, in which the angle $\alpha$ forms the azimuth angle, and the angle $\beta$ the elevation angle. The direction of the vector V thus in this case points to the gondola 1.2 of the element 1 on which wind acts. This is in fact a "geographical coordinate system", since the gondola 1.2 and the element 1 on which wind acts move essentially on the surface of a sphere. The azimuth angle $\alpha$ and the elevation angle $\beta$ thus indicate approximately the geographical latitude and longitude of the position of the gondola on the "world sphere" covered by the vector V. The length of the vector V roughly indicates the length of the hawser 1.1, in which case, initially, its catenary drop will be ignored.

The gondola 1.2 of the element on which wind acts is aligned on the basis of its own coordinate system with the directions $x_k$, $y_k$ and $z_k$, where $z_k$ points in the direction of the extension of the vector V. The rotation of the gondola 1.2 of the element 1 on which wind acts about the vertical axis $z_k$ is referred to as the yaw angle. Variation of the yaw angle results in a change in the direction of flight of the element 1 on which wind acts. The yaw angle can be varied, inter alia, by actively driving braking flaps (which are described further below) of the paraglider which forms the element 1 on which wind acts. This results in a direction change, and this process is comparable to the steering of a steerable kite. Rotation about the longitudinal axis $x_k$ represents a rolling movement and is not actively controlled. The catenary drop of the hawser 1.1 resulting from the force of gravity can be determined from the rolling movement and the corresponding discrepancy between the direction from $z_k$ and V, while the rotation about the lateral axis $y_k$ forms the pitch of the element on which wind acts about the lateral axis, and can be caused by gusts and their influence on the hawser 1.1. This reference system forms the basis for understanding of the description of the vessel/kite system which is described further below.

Figure 1B:
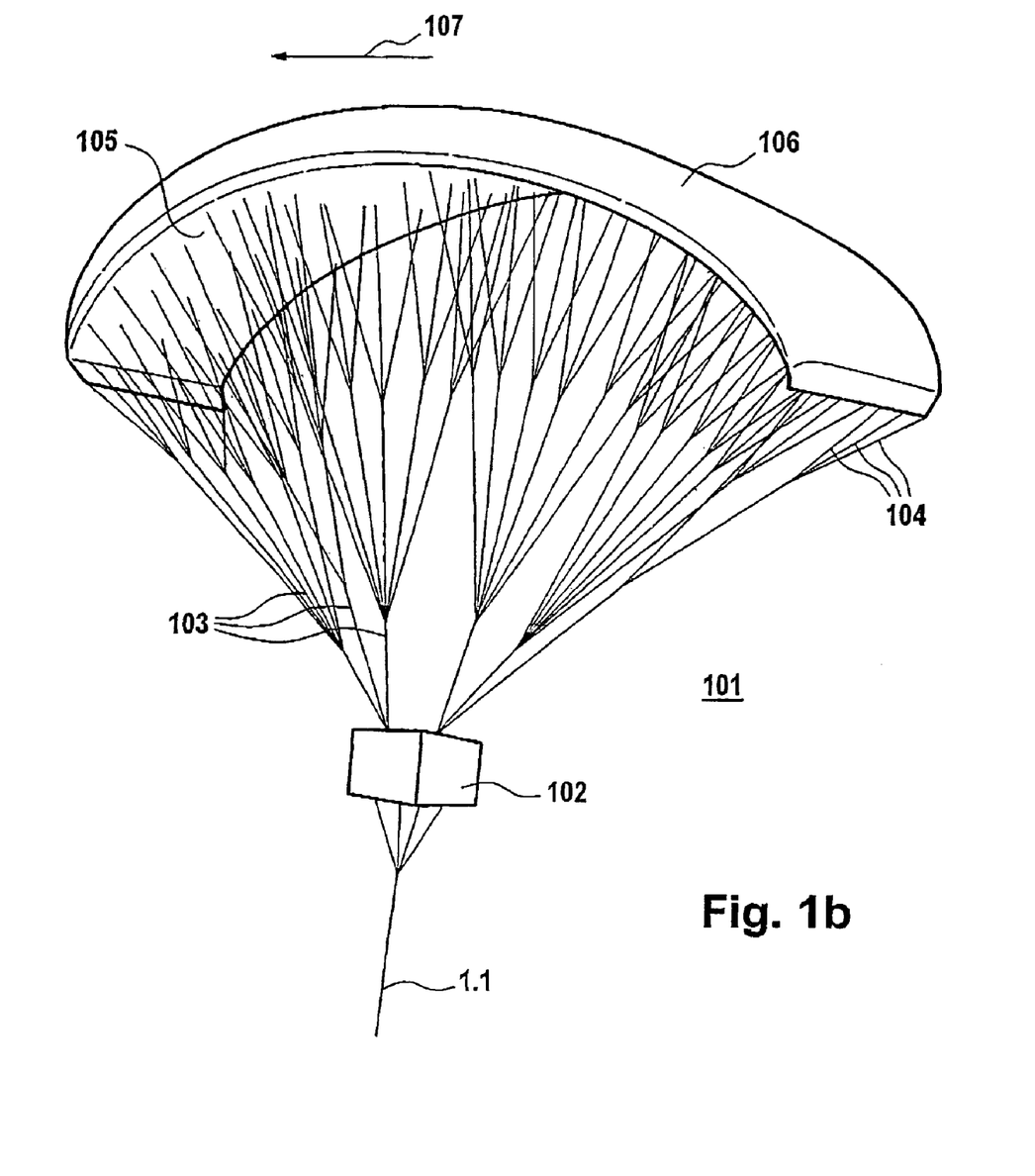

One exemplary embodiment of an element on which wind acts is illustrated schematically in FIG. 1b. The element on which wind acts in the illustrated embodiment forms a paraglider 101 with a container 102 for the controller, as will be described in more detail further below. Holding lines 103 originate from the container 102, which is attached to the hawser 1.1, and merge into branches 104 in the form of a line tree, which are connected to a lower textile covering layer 105. An upper textile covering layer 106 forms the closure at the top. The two covering layers are held together by means of internal connecting lines (which cannot be seen in the figure) or corresponding connecting elements, such as textile ribs, with the wing profile which is formed by the two covering layers being stabilized by an internal increase in the air pressure, which is built up via openings in the leading edge of the kite (on the left in the drawing), which are likewise not shown in the drawing, for clarity reasons. The direction of flight is indicated by the arrow 107.

Figure 2:
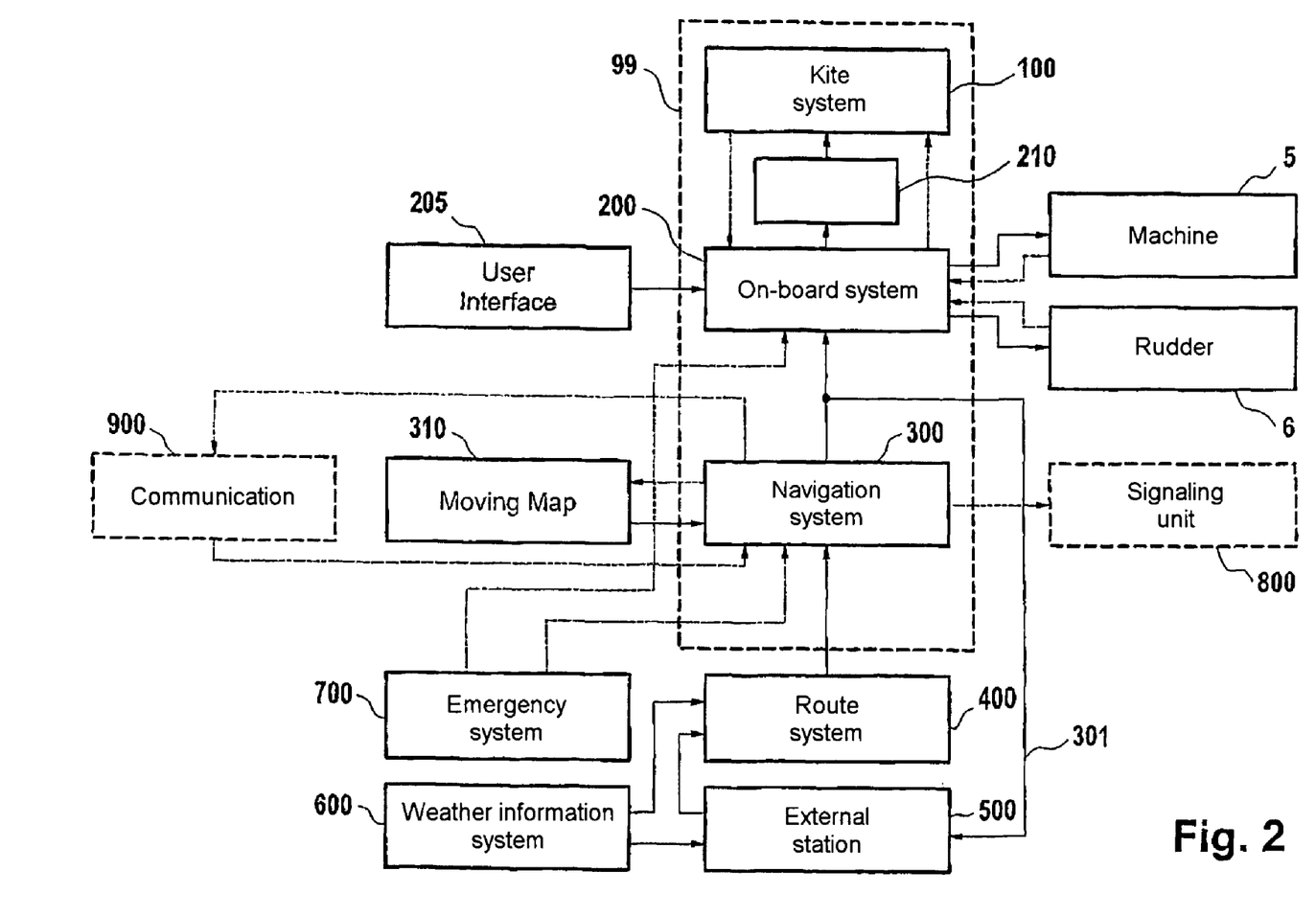
FIG. 2 shows an outline circuit diagram for control of the element on which wind acts, illustrated schematically.

FIG. 2 shows an outline illustration of the wind propulsion system, in the form of a block diagram. The figure also serves for orientation in the following description of the individual system components. Those reference symbols in the 100-series which are used in the overview illustration also form the group designation of the system parts which are each described in more detail further below. (A dashed line 99 in this case surrounds those assemblies which, at the least, must be added to a conventional vessel for it to be additionally equipped with the wind propulsion). The system 100 on which wind acts comprises the element on which wind acts as well as the associated control system, if the latter is arranged directly in it. The arrangement may in this case not only be arranged in a gondola which is located at the end of the hawser and from which the holding lines originate, but may also be incorporated directly in the element on which wind acts. The control system essentially comprises an autopilot, which controls the attitude and flight path of the element on which wind acts.

The system 100 on which wind acts is connected via the hawser and a winch 210 (including the hawser) and communication paths, represented by dashed lines, to the on-board system 200 to a user interface 205, which comprises a control system which not only controls the kite position but also emits the necessary control commands to the machine 5 and to the vessel rudder 6. The on-board system is connected to the element on which wind acts via various communication paths which allow not only the kite position to be predetermined in principle by the on-board system but also allow information which is important for the on-board system to be received from the system on which wind acts.

The on-board system 200 is preceded by a navigation system 300, which transmits to the on-board system the route to be maintained by the vessel, taking into account costs, times, speed and wind utilization, possibly as well as the wind direction and wind strength. The wind information may also include a parameter which characterizes how gusty the wind is. Furthermore, this may also include information relating to the sea state and to the vessel movement resulting from it. (The wind and weather data in this case come originally from the weather information system 600, which is described further below). The navigation system is assisted by the navigational information base (moving map) 310.

The course, wind and wave information are used to generate signals which drive the on-board system 200 and results in appropriate adjustment of the kite system 100. The on-board system 200 also produces drive signals for the machine 5 and for the rudder 6.

The navigation system 300 is driven by a route system 400, which determines the course of the vessel by means of the economic basis on which the vessel operation is based. The route system 400 is driven on the basis of data which is predetermined by an external station 500 and is matched to the data from a weather information system 600. The course data currently determined by the navigation system 300 is fed back to the external station 500 via a feedback link 301 (by radio, satellite). The data can also be received by other vessels equipped with the system and can be used for local updating of the weather system. This also makes it possible to take into account current, locally dependent course changes for the rest of the external predefinition of the route.

As can be seen, the kite system 100 is positioned as a function of the course data such that an optimum route is preset both on the basis of the weather conditions (actually occurring winds and sea-state conditions) and taking into account the economic constraints which are intended to ensure that the vessel is operated to save as much cost as possible.

An emergency system 700 provides the required control commands in the event of an unpredicted event which necessitates immediate action in the form of an emergency maneuver.

The signaling system and communication system are respectively combined in further blocks 800 and 900, and match the navigation to further vessels. The signaling system includes navigation safety lighting as well as the transmission of its navigation data by radio, which informs other vessels located in the vicinity about the deployed system on which wind acts and about the intended route and the current course. In contrast, the communication system includes all of the systems which relate to the rest of the information interchange process.

The main dataflow paths are represented by solid lines in FIG. 2, while the other message paths are represented by dashed lines.

Figure 3:
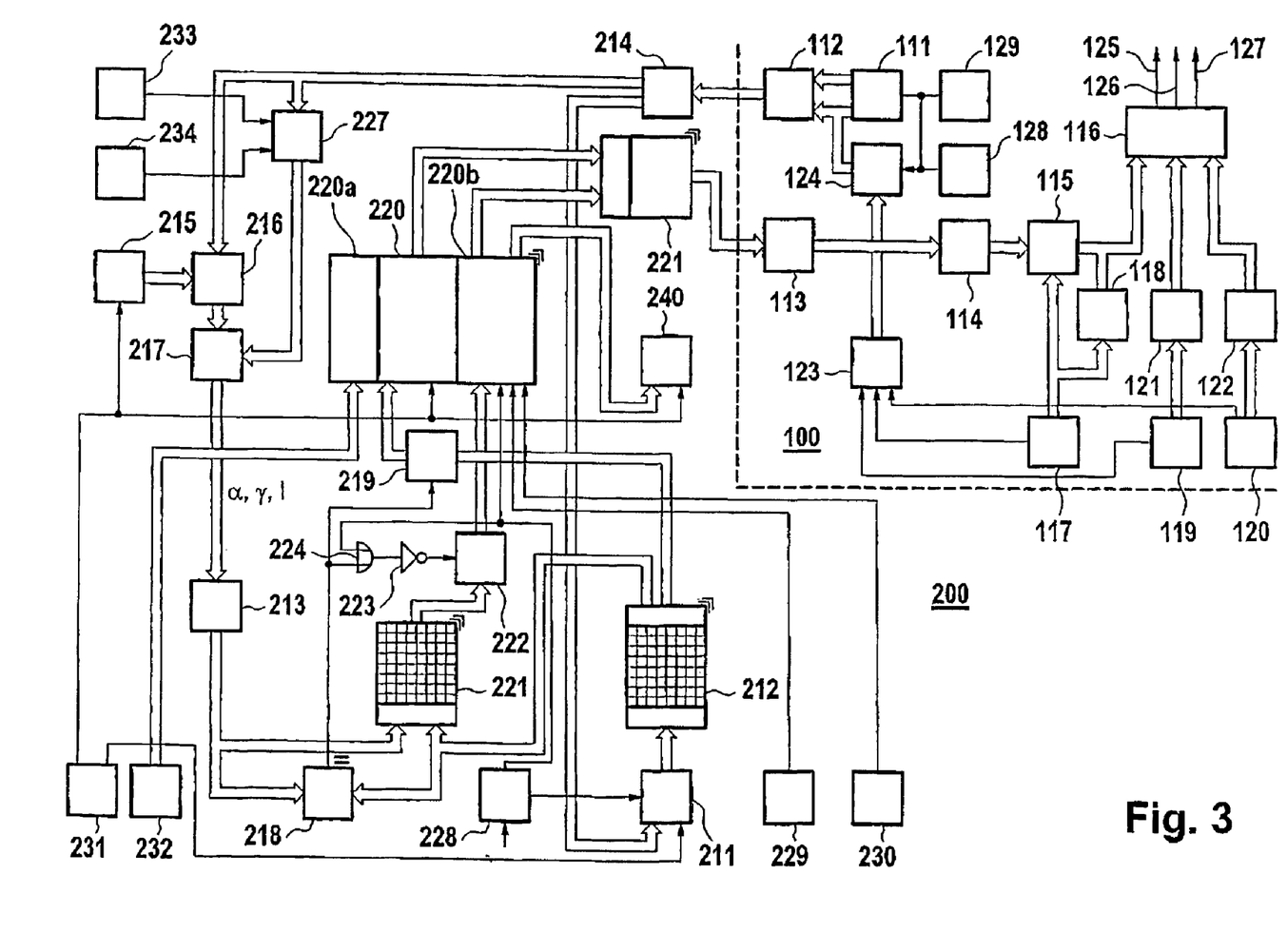
FIG. 3 shows a detailed illustration of the control of the wind propulsion system, in the form of a block diagram.

FIG. 3 illustrates in more detail the block 100, which comprises the system on which wind acts, as well as the block 200 with the on-board system from FIG. 2. The positioning and the control of the kite 101 are described here. The wind-direction and wind-speed information, including the gust characteristic as well as the sea-state information, are passed to a buffer store 211 in which this data is stored for buffering. Since the wind direction and all of the kite settings relate to the apparent wind, the course information is irrelevant during the processing. The adjustment and the maneuvering of the element on which wind acts with respect to the vessel does not require any knowledge of the current course, since all of the maneuvers relate to the vessel and to the influence of the apparent wind acting on the kite. During the deployment of the kite 101, the wind information initially comes from the weather information system 600 in FIG. 2, with regard to the positioning of the kite. As soon as its own wind measurement is operational after launching, however, the apparent wind at the location of the element on which wind acts is itself determined, since this is the governing factor for positioning.

The wind data and sea-state data together form a data record which addresses a memory 212, which forms a look-up table, for the required position and the maneuver type of the element on which wind acts. This look-up table is organized in the same way as a normal addressable memory, with the output data from the buffer store 211 addressing, as address signals, the individual memory locations in which the state data associated with the addressed data for the element on which wind acts are stored. A "look-up table" such as this links the input data and output data with one another in the form of a "read only memory" (ROM) in accordance with a predetermined functional relationship, and can thus be understood as a mathematical association (function). However, the corresponding blocks form only one example of an implementation and can also be replaced by any other desired functional elements or assemblies. By way of example, this may comprise a microprocessor in which the control software is stored in an appropriate memory, or else it may be an electrical circuit in which the functional relationship is defined in the form of an analog computer by the electrical components involved. The representation in the form of a look-up table has been chosen here for the sake of clarity, because a solution with a microprocessor, for example, can be represented less clearly only because the various program steps, which have to be carried out successively, require complex considerations relating to which program parts must be supplied successively to the microprocessor.

In the chosen embodiment, the control signals can be processed in parallel, although those switching elements which result in activation of the illustrated blocks at specific times and the corresponding control processes, are not illustrated. For the sake of simplicity, it is assumed that an incoming control signal which differs from the previous signal state which initiates the processing in the downstream blocks, which retain the relevant state that has been reached, forces new processing to be carried out until a signal change occurs.

The state data thus includes on the one hand the required position of the element on which wind acts, that is to say its direction with respect to the vessel and the length of the hawser to be deployed. Furthermore, if required, it also contains information about whether and when the kite 101 should in fact be maneuvered on the basis of which stored program. While the kite is guided in the steady state, that is to say in a fixed manner, in a number of positions, it is better for vessel operation in some circumstances for the kite to be controlled dynamically, that is to say for predetermined flight figures to be carried out, since this increases its relative speed with respect to the wind and, as a consequence, its towing power as well. The current position of the kite is stored in a further memory 213, as determined by the navigation system of the kite 101.

The actual position of the kite, which is stored in the memory 213, relates to the vessel and is preferably determined by subtraction of two GPS signals. This relates on the one hand to the GPS receiver 124 for the kite 101 within the kite system 100, which is connected to the flying kite 101. The position data determined in the flight position of the kite 101 is transmitted by means of a transmitter 112 to a receiver 214 which is located on board the vessel. A further GPS receiver 215 is likewise provided on board the vessel. Its output signal together with the output signal from the receiver 214 are supplied to a subtraction unit 216, by means of which the differential GPS signal is produced. The difference position data is converted in a block 217, which is connected downstream from the subtraction unit 216, to polar coordinates, which relate to the distance between the winch 2 and the position of the element on which wind acts. These are the angles $\alpha$ and $\beta$ as shown in FIG. 1a as well as the cable length "L". The differential GPS position data obtained in this way is highly accurate if determined at the same time and if the vessel GPS receiver is installed at a location which is affected as little as possible by vessel movements, or if the movements are compensated for.

Furthermore, in this case, it is necessary to take account of the coordinate difference between the positions of the winch and of the GPS receiver in the vessel by subtraction of a fixed value. The position determined by the differential GPS receiver formed in this way is determined at time intervals. If its precision is not adequate, it can be assisted by values which are determined by means of acceleration sensors 117, 119 and 120. The corresponding calculations, which include an integration process, are carried out in the assembly 123. Since only the times which pass before the next GPS position signal are of relevance for the time intervals within which the integration process must be carried out, the integrators do not need to comply with any quality requirements which would guarantee stability over long time periods. (The acceleration sensors are intrinsically used for stabilization of the flight maneuvers, as will be described further below—that is to say they have a dual function). Furthermore, an altimeter 129 (preferably in the form of an air pressure meter) and an earth's magnetic field sensor 128 are provided, with the data items from both of these likewise being supplied to the memory for the navigation signal 124.

A further possible way to determine the actual position of the element on which wind acts with respect to the vessel is to use the data transmitted to the vessel from the altimeter 129 and from the earth's magnetic field sensor 128. This data is transmitted to the vessel in block 227, and is stored. A subtraction process is then carried out in block 227 with the data from the altimeter 233 on the vessel and from the earth's magnetic field sensor 234 on the vessel. If the altimeter 129 is an air pressure meter, weather data from block 600 (isobars) may, however, also be used for determination of the air pressure at the vessel. The position information determined in this way is supplied to the block 217, and if required is matched to the GPS data. This results in the position information from two independent systems being used for mutual support and, if one system fails, the required data is still available.

The required kite position read from the memory 212 is now supplied on the one hand to a comparator 218, which outputs a signal when the actual position of the system 100 on which wind acts, and which position is stored in the memory 213, matches the required position read from the memory 212. In this case, a data record which characterizes the selected maneuver type is read from the maneuver type memory 220 via an enable circuit 219. (In this case, a steady-state flight state may also however be distinguished by the kite not carrying out any maneuvers but remaining in the same flight position. This is the "zero" maneuver type.)

Thus, when this maneuver type memory 220 is activated, a flight program of the sequential type is read, and is transmitted to the autopilot for the system 100 on which wind acts. The output signal from the memory 220 is in this case passed to a transmitter 221, which emits the data and supplies it to a receiver 113 for the system 100 on which wind acts. The signal is passed from the output of the receiver 113 to an autopilot assembly, and from there to a maneuvering control unit 114, which receives signals which identify specific sequential flight maneuvers and converts them to turn values which are supplied to the flight processor 116, which carries out the relevant flight maneuver. In this case, the value to be set is transferred to a turn value comparator 115 to which, on the other hand, the input signal of the yaw value meter 117 is supplied. The flight processor 116 now produces turning flight in the predetermined sequence and for the predetermined duration at its relevant output 125 via an appropriate drive element on the kite 101 by asymmetric braking of the kite 101 or appropriate aerodynamic deformation. The other aerodynamic effects, which are driven by the two other outputs of the flight processor 116, are adjustment of the wing incidence angle and the reefing process, as will be described further below.

The winch 240 is also driven from the positioning memory 220b in order to feed out to a specific required cable length.

In order to prevent oscillation about the vertical axis, a signal which has been filtered by means of a high-pass filter is additionally supplied to the flight processor 116, superimposed on the control signal but with an offset phase angle, thus preventing the start of oscillations. While yaw movements can be controlled via the output 125, the incidence angle of the wing is set via the output 126. As is known, the lift/drag ratio can be optimized by the magnitude of the incidence angle of a wing. The reefing of the kite 101 can be initiated via a further output 127. Reefing changes the lift and drag, and may be necessary for individual flight maneuvers.

Since the kite is guided firmly on the hawser, it is automatically stabilized by the tension effect of the cable at its center of lift, with regard to its rolling and pitching movements. However, in order also to preclude oscillations in this case, an attitude signal is in each case transmitted in a corresponding manner from a roll sensor 119 and a pitch sensor 120 via corresponding inverting high-pass filters 121 and 122 to the flight processor, thus avoiding and compensating for sudden attitude changes of the element 101 on which wind acts.

Thus, when the kite is in its predetermined position (an output signal which identifies this state appears at the output of the comparator 218), then the selected maneuver type is read, which causes the kite to carry out a predetermined cyclic flight program. If this maneuver type is transmitted, the control is carried out automatically by the autopilot for the element on which wind acts, and the unit 200 no longer need react provided that the kite does not leave its required position as a result of unpredicted events.

If the required position of the element 101 on which wind acts does not match its predetermined position, possibly because the preset position which has been read from the memory 212 has changed—as is also the case when the kite is deployed—or possibly because the kite has left its position during the course of the maneuvering, then the output signal at the output of the comparator 218 disappears, and the maneuver type, activated via the switching element 219, of the memory 220 ends. The signal "zero" appears at the output of the memory for the maneuver type 220 (left-hand part), and this is interpreted by the autopilot of the system 100 on which wind acts as meaning that the most recently stored maneuver is no longer being carried out. Instead of this, the actual position of the kite, which has been read from the memory 213 and has been determined by GPS, is compared with the required position from the memory 212 by means of a position correction unit 221, and a maneuver is determined which guides the kite to the required position. The correction unit 221 is once again in the form of a look-up table, with the required position and the actual position (once again related to the vessel) being combined to form a common addressing signal, and the identity of a corresponding correction maneuver for the element on which wind acts being read from the actual position A to the required position B. Specifically, care must be taken to ensure that different maneuvers must be chosen depending on the launch and destination point (and possibly also as a function of the wind and wave conditions), in order to maneuver the kite. However, any desired kite maneuvers can be chosen and carried out by means of the stated measures.

If the wind level and sea state play a role in the maneuvers to be carried out, then this data can be "looped-through" from the memory 211 through the look-up table memories 212 and 221, so that this data is still available in the data record for selection of a specific maneuver, and a suitable maneuver can be chosen. However, this does not relate to compensation for individual events, but to general setting guidelines which, for example, may include the kite being flown relatively in a high sea state such that it is possible to compensate as far as possible for the forces acting on the watercraft as a result of the direction of the waves. Thus, for example, if the vessel were to be heeling severely, it would be preferable to use a kite position with a lateral component, while a straight-ahead component would be preferable for a vessel which is pitching severely. For this reason, an output signal from the block 231 for detection of the sea state is passed directly to the block 211, in order to supply information which also affects the choice of the appropriate kite position and maneuvering in the sense described above. A further function of this link is to choose parts of flight maneuvers such that they counteract the accelerations resulting from the sea state. This includes the flying of maneuvers with cyclic flight paths, in which different tension forces act on the hawser at different times, in such a way that these forces occur with a phase shift with respect to the accelerations which are caused by the sea state. This reduces the overall movements of the vessel. This compensation for or reduction in vessel movements by different tension forces, which are caused by the maneuvering, do not interfere with the other methods that are used for sea-state compensation. This is because vessel movements which have been reduced from the start require less effort in order to reduce their effects on the kite flight path. Because of the compensation for the individual vessel movements, reference is made to the description of the block 231 further below.

For position changing, the right-hand part of the memory 220 is addressed via a switching element 222 with the data record that has been read from the correction unit 221, with the switching element 222 being activated by the output signal from the comparator by means of an inverter 223 when the switching element 219 is not activated, that is to say when the required position and actual position are not the same.

Furthermore, the flight stability of the element on which wind acts may also play a role for its position. A multiple-direction ram-air pressure meter 111 provided on the kite on the one hand acts as an anemometer while on the other hand, for that component which is measured in the direction of flight, transmits the state of an incident flow on the kite being excessively low by means of an appropriate signal which, together with the production of a position changing maneuver, also drives the winch controller 240, thus speeding up the change in position of the kite so that the incident flow speed is increased again. (It is evident that the winch can also be driven in the case of "deliberate" position changes resulting from wind data and wave data via the right-hand part of the memory 220b in order, for example, to allow the height of the element on which wind acts to be changed).

For determination of the true wind direction and wind speed, the anemometer has pilot tubes pointing in different directions and having pressure capsules which are evaluated separately. The direction and speed of the wind can be determined with respect to the alignment of the anemometer 111 from the pressure values from the three pressure capsules which are directed at right angles to one another and have the highest pressure values. If the output signal from the magnetic-field sensor 128, which contains a bridge circuit composed of magnetically sensitive resistances and thus makes it possible to determine the direction of the lines of force of the earth's magnetic field, is also taken into account, then the direction of the wind can be related to the northerly direction and can thus be transmitted to the watercraft as the direction of the apparent wind on the element on which wind acts. If required, the correction from magnetic north to geographic north is then also carried out in the watercraft.

An arrow pointing to the block 211 indicates that normal navigation of the kite is rendered inoperative in this case. The rest of the normal maneuver control is also suppressed via an OR gate 224 connected upstream of the inverter 223. (This also applies in a corresponding manner to the blocks 228, 229, 230 and 232, which will be described in the following text and initiate further special functions. However, the associated signal links have been omitted there for reasons of clarity).

The block 228 initiates the "emergency jettison" emergency maneuver by selection and starting of the associated maneuver type via the right-hand part of the maneuver type memory 220b, which contains the respective programs. This maneuver is necessary when the element on which wind acts results in a major risk to the vessel, as a result of unfavorable circumstances or an accident (for example by collision with an obstruction). In this maneuver, the element on which wind acts is completely disconnected from the vessel.

The blocks "deploy" 229 and "stow" 230 initiate the appropriate maneuvers by selection and starting of the relevant maneuver type via the right-hand part of the maneuver type memory 220b, which contains the respective programs.

A block 231 "vessel movements" determines the acceleration component in the direction of the hawser by means of an appropriately aligned accelerometer and, after integration, generates a signal which describes the vessel movements in the direction of the hawser. This signal is supplied to the on-board GPS receiver which produces a position signal (in order to correct the position of the winch controller 240) if the receiver and/or the antenna are/is not themselves/itself mounted in this position. If this GPS position signal were to be evaluated directly together with the GPS position signal received via the receiver 214 from the kite system 100 and were to be used to control the kite 101, then the kite 101 would follow the sea-state movements of the winch in its control process. However, since the kite 101 is intended to fly its maneuver with respect to an imaginary stabilized vessel position, the integrated signal from the accelerometer is additionally supplied, in block 231, to the GPS receiver 215 in order to be subtracted (as a disturbance) from the signal which is supplied to the block 216 for processing, so that the position signal of a "stabilized platform" is processed there. This results in the kite 101 flying maneuvers which are free of sea-state disturbances. Specifically, it can be seen that the sea-state components acting in the hawser direction have the main effect on the flying object while in contrast components in the lateral direction with respect to this contribute only to a change in the angles $\alpha$ and $\beta$ of the flight vector which tends to zero when the hawser is long, and can thus be ignored.

In order to avoid the occurrence of a situation all the time in the described exemplary embodiment in which a flight maneuver that is being carried out is interrupted, when the sea state is high, by the detection of a discrepancy in the difference block 218, with the need to carry out a controlled "flight" to the correct position (in this case by activation of the winch 240 via the right-hand maneuver block 220b), there is a direct link from the block 231 to the winch controller 240. The winch controller 240 directly receives the command to pay out and to wind in, in response to the sea-state movement in the hawser direction being found by the block 231, so that the vessel movements are compensated for directly for the kite. A position correction by means of an appropriate maneuver is initiated only when this compensation is no longer sufficient, for whatever reason.

In order to allow maneuvers to be initiated manually as well, the appropriate input commands can be made by means of a user input 232, which is part of the user interface 205 in FIG. 2. Appropriate commands can be used to directly transmit control commands to the autopilot unit and to the winch controller 240 in the left-hand part 220a of the maneuver memory for manual commands, with the rest of the signal output from this memory being suppressed. These comprise the functions "left", "right", "straight", "reef", "unreef", "incidence (+)", "incidence (−)", "winch (+)" and "winch (−)". The intensities of all of the commands can be modulated.

In the case of one variant which is included in the described embodiment, "predictive maneuvering" is carried out by inputting fictional wind and course data into the system in order to calculate the current position of the element on which wind acts, with the configuration that is then selected being displayed for information. The vessel control system can then estimate the predictable behavior of the system from this, and can appropriately adjust the navigation. This multiple processing of the data in the form of possible prediction is represented in FIG. 3 by multiple angles at the corners of various memory elements, with the aim of indicating that the contents of these memories are evaluated more than once, independently of the current process control. Thus, in this case, additional memory means and comparative means are provided, which allow storage of signals associated with previous times with signals which occur at later times in such a manner that successive maneuver states can be compared on the basis of different—including fictional—input data.

Figure 4:
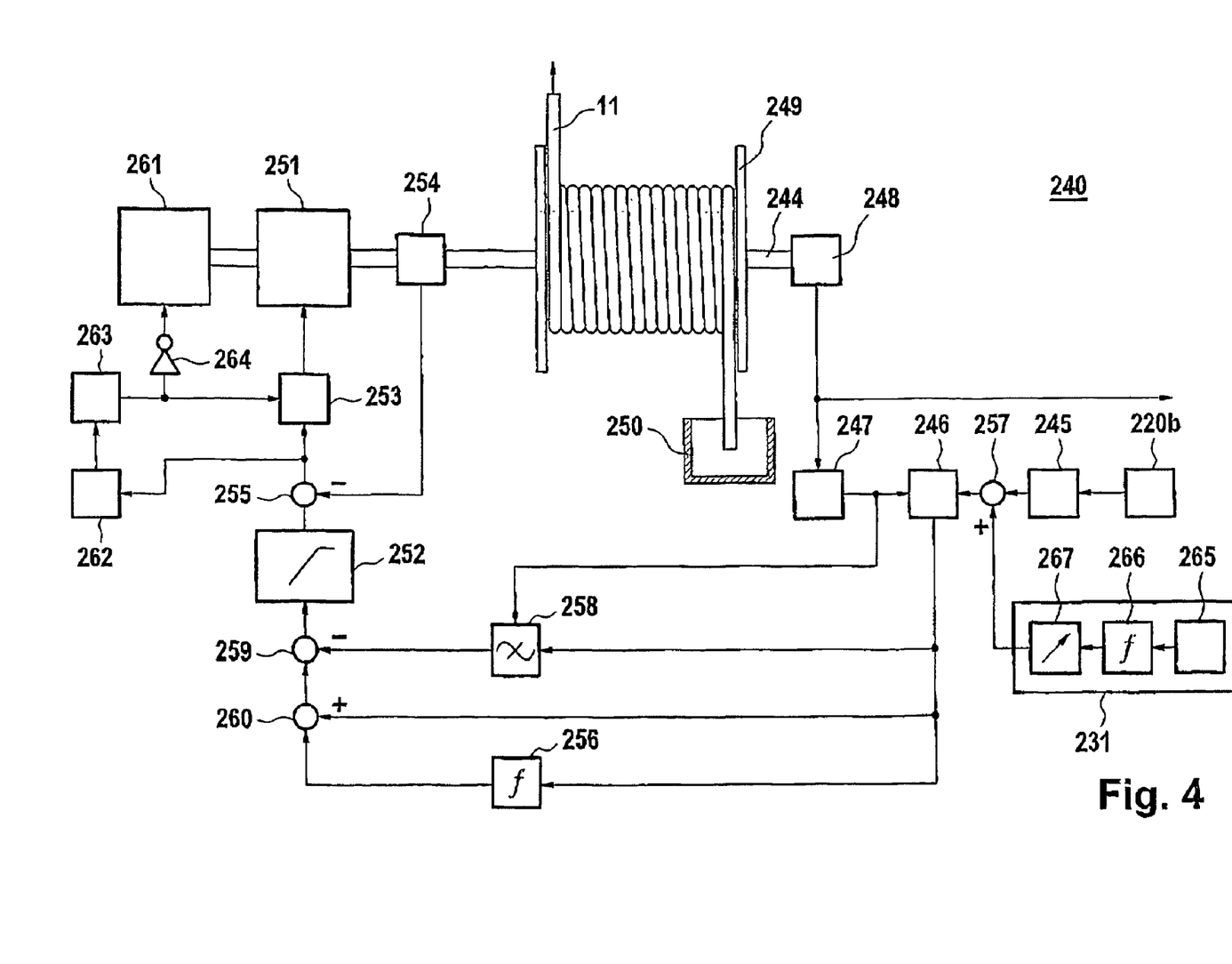
FIG. 4 shows a block diagram of the positioning device.

FIG. 4 shows in more detail one exemplary embodiment of the winch controller 240 as shown in FIG. 3 of the positioning system for a wind propulsion system. The mechanical elements of the winch are in this case grouped on a common drive shaft 244. In this case, the output signal from the right-hand part of the memory 220b in FIG. 3, which represents the cable length to be deployed, is supplied to a memory 245 which stores this required cable length as a digital numerical value. The digital value contained in the memory 245 is supplied to a proportional comparator 246 which subtracts this value from a further value, which is supplied to it from a pulse counter 247. This pulse counter 247 is itself driven by a position sensor 248 (which in particular operates photoelectrically) which is connected to a windlass drum 249, which carries the hawser 11. The deployed length of the hawser 11 may, moreover, also be transmitted in a different manner. This could be done, for example, by means of optical, magnetic or other markings which are fitted to the hawser itself and are detected by appropriate sensors.

The hawser 11 is driven by friction by being looped a plurality of times around the windlass drum 249, with the cable being stored in a storage area 250, which is illustrated only schematically. In one alternative embodiment, which is not illustrated, the hawser can also be unwound from a cable drum, which then replaces the windlass drum. A further advantageous exemplary embodiment which is not illustrated is a windlass drum together with a cable drum, which is used as a cable store. However, apart from this, a corresponding design is used.

The windlass drum 249 is driven by a motor 251. The motor preferably has an integrated transmission, which is not illustrated in any more detail. The pulse counter 247 thus determines the cable length which has actually been unwound by counting the pulses emitted from the position sensor 248, the number of which is proportional to the revolution of the windlass drum 249. In one alternative embodiment, which is not illustrated, the length can be determined by means of a friction wheel (which rests directly on the cable) with a pulse transmitter. The signal emitted from the proportional comparator 246 thus corresponds—depending on its polarity—to the cable length which is still to be unwound or wound up by the windlass drum 249. This output signal from the proportional comparator 246 is supplied directly as a proportional component via an addition point 260 to a characteristic transmitter 252, which produces a control signal, that is proportional to the cable length, for the motor 251. The output signal from the characteristic transmitter is limited to a high value and a low value on the basis of a linear profile, thus resulting in a non-linear characteristic. The gradient of the characteristic is matched to the cable characteristics so that overstraining is also prevented in this way. The linear area of the characteristic is matched to the elasticity characteristics of the cable, while a force limit is provided if there is a threat of overloading, so that the cable can run out freely when there is a threat of it breaking.

Up to the stated limit values, the motor 251 is thus preferably driven proportionally to the cable length to be deployed or to be pulled in. This results in a drive characteristic which is comparable with that of a spring. If the illustrated motor 251 is an electric motor whose torque is proportional to the current supplied, then it is sufficient to connect the output of the characteristic transmitter 252 to the energy source 253, which in this case is in the form of an electricity source. The characteristic transmitter predetermines a torque, which is intended to act on the motor output drive shaft, for the respective input variable. The gradient of the characteristic defines the "reaction capability" of the winch to the corresponding drive signals. This is variable in order to comply with different operating conditions (for example the size of the element on which wind acts). During operation the gradient of the characteristic is set such that the winch movements stabilize below an excessively "nervous" reaction behavior.

However, in the case of drives of a different type, it is possible for the energy source 253 to supply a different energy variable which does not lead directly to a proportional torque at the drive motor 251. This may be the case, for example, when it is not possible to use electrical drives in an explosion-hazard environment, as is the case by way of example on tankers. In this case, the motor 251 may be in the form of a steam motor or hydraulic motor—or in particular in the form of a variable-volume hydraulic motor or a pair comprising a variable-volume hydraulic pump and hydraulic motor—with a torque measurement device 254 being provided on the output drive shaft, the output signals of which are supplied with negative polarity to a feedback point 255 downstream from the characteristic transmitter 252.

The signal emitted from the energy source is in this case increased until it is compensated by the negative feedback signal from the torque measurement device 254. This allows the desired characteristic to be produced with any given drive motors. Furthermore, an integrator 256 is connected in the signal path between the proportional comparator 246 and the characteristic transmitter 252 and prevents any remaining control error in the setting of the cable length, in such a way that it increases or decreases the signal supplied to the characteristic transmitter to a great extent the longer the time for which it is present. Furthermore, an adjustable filter 258 with a downstream subtraction point 259 is connected in parallel with this, with the filter being designed such that, in particular, it passes resonant frequencies of the cable including the winch, and suppresses them by negative feedback. The frequency of the filter 258 is variable, with the frequency setting being influenced by the output signal from the pulse counter 247, which emits a value which corresponds to the deployed cable length.

In this way, the frequency of the filter is varied corresponding to the cable length, so that it is possible to compensate for possible resonances whose frequencies are influenced by the cable length. In the illustrated exemplary embodiment, only the trend of the change is taken into account, on the assumption of linear adjustment. If precise matching is intended to be achieved, which follows the square-law or other functional profile, then an appropriate function transmitter must be connected in the line from the pulse counter, which may likewise be in the form of a digital look-up table, corresponding to the other illustrated exemplary embodiments. When addressed by a digital value which corresponds to the cable length, the associated control variable, as appropriate for the setting of the desired filter frequency, is output. In the case of a digital filter, these are the appropriate digital control commands. In the case of a filter of analog design with varicap diodes, a voltage generator is programmed by means of the appropriate control variable in order to set the appropriate output voltage for drive purposes.

The illustrated circuit is a digital control system, so that the integrator 256 and the filter 258 likewise operate digitally. The output signal from the position sensor 248 provides a measure of the forces acting on the kite, and of its time profile, so that this can be used for evaluation of the kite activity.

In order to also compensate for the effects of the vessel movements on the cable guidance, an acceleration sensor 265 is provided and is effectively installed in the vicinity of the winch, in the direction of the cable. A downstream integrator 266 converts the determined acceleration values to appropriate distance signals, which likewise act in the direction of the cable. The component of the vessel movements acting in the cable direction is thus compensated for by appropriately winding up and unwinding the cable, so that the vessel movements do not affect the position of the kite.

A brake 261, which is preferably in the form of a disk brake, is provided on the motor shaft for situations in which, by way of example, no cable movements are required when the sea is calm. This is driven by a subtractor 262 with a downstream Schmitt trigger 263, which emits a signal only when the output signal from the subtractor 262 exceeds a predetermined value, that is to say the driver voltage for the motor 251 varies. The output signal from the Schmitt trigger then releases the brake via an inverter 264 (and a corresponding driver which is not illustrated), and activates the energy source (driver) for the motor. Otherwise, the brake 261 remains applied and is deactivated. This also saves power for the drive motor 251.

In one alternative embodiment, which is not illustrated, another belt brake, which acts directly on the windlass drum 249, can also be provided in addition to the first disk brake 261 which acts on the motor side. This is advantageous, by way of example, in terms of the duplicated safety that is required by some licensing authorities, since it is possible to brake the windlass drum even if the motor transmission or the shaft 244 breaks down.

The assemblies describes so far ensure that the cable is in each case deployed to a predetermined length and that the winch acts effectively as an "elastic element" in order to counteract overstraining of the cable. Furthermore, resonance processes on the cable are damped, so that excess forces, which would endanger the cable, cannot occur as a result of resonance conditions.

A further measure now also ensures that the sea state and the vessel movements which result from it do not affect the position of the element 101 on which wind acts, or affect it only in a controlled manner. The assembly 231 (see FIG. 3) is used for this purpose, which has an acceleration sensor 265 which acts in the cable direction. The output signal from the acceleration sensor 265 is supplied to an integrator 266 which converts the accelerations to a distance in the cable direction. The signal is then passed via a downstream metering device/inverter to an addition point 257, in order to be supplied to the proportional comparator 246. The assembly 267 in each case varies the position of the kite 101 with respect to the vessel to compensate for the sea-state movements by paying out and pulling in the cable, so that the kite 101 maintains its altitude with respect to the average sea surface, and is not influenced by the vessel movements. This is advantageous in particular in calm-wind conditions and when there is a swell, when the flight of the kite should not be influenced by additional forces.

However, it may now also be desirable for the vessel movements to be damped by the drag on the element on which wind acts, while the kite is flying in a stable manner. The potentiometer 267 is provided for this purpose and allows metering and polarity reversal of the output signal for the integrator 266. This makes it possible to meter that component with which the integrated vessel movement signal acts in the cable direction on the kite position, and also to reverse its polarity, so that it can either damp the movements of the kite or else the movements of the vessel.

The winch is provided with means which result in the hawser being pulled in if a predetermined pulling force is undershot and/or in the event of imminent stall or if stall has occurred and/or in the hawser being paid-out if a second predetermined pulling force is exceeded and/or a predetermined incident-flow speed is exceeded. The pulling force is determined by the torque measurement device 254 of FIG. 4. If the torque of the winch and the diameter of the loops around the hawser are known, the pulling force can be easily calculated. Additionally, the pulling force can be indirectly determined by the anemometer 111 of FIG. 3. This information is then fed into the system and if the force is below that which would indicate that there is an imminent possibility of a stall, the motor and brake are actuated to reduce the length of the hawser. Alternatively, if the pulling force or wind speed is above a certain level, the information is transferred to the system and in turn to the brake and motor of the winch to pay-out the hawser. An imminent stall or a stall which has occurred can also be determined by the anemometer. The wind speed data detected by the anemometer is transferred to the transmitted 112 and is received by the receiver 214 on the ship. The wind data is sent to the buffer 211 and memory 212 and to the right hand part of the memory 220b to the circuit 240 of FIG. 4. The signal then proceeds to the characteristic transmitter 252 where it is compared to the stored value and an appropriate signal is sent to the motor 252 and brake 261.

Means are provided which initiate the pulling-in or paying-out only when the undershooting, overshooting or stall last for a predetermined time period. This is accomplished by setting the gradient of the characteristic transmitter 252.

The means are designed in such a manner that the output signal from the sensor for imminent stall or for stall which has already occurred is supplied to a converter which drives the winch in order to shorten the hawser in such a manner that the incident flow on the element on which wind acts is increased to such an extent that the lift of the element on which wind acts is sufficient in order to at least keep it in the air. To this end, the anemometer 111 sends its signal through components 112, 214, 211, 212 to the processor 220 which contains the memory section 220b (FIG. 3). From the memory section 220b in FIG. 4, the winch is operated as indicated in FIG. 4 by way of the connections through the characteristic transmitter 252 to the drive motor 251 and/or brake 261.

The means are designed in such a manner that, when the incident flow exceeds a predetermined value, the length of the hawser is increased successively again until it has reached essentially the same length as before it was shortened. The entire circuits and controls are configured in such a way that the length of a hawser normally is returned to a normal length such that the length can be decreased or increased as necessary. The normal length is stored in the position memory 220B. In order to detect the length, a pulse counter 247 is provided which, in turn, as shown in FIG. 4 actuates the drive motor 251 and brake 261.

The winch drive has a predetermined torque/hawser-length characteristic which is always formed with a predetermined delay time constant in the region of the currently deployed hawser length, so that hawser shocks are absorbed. This torque/hawser-length characteristic is stored in the characteristic transmitter 252. This serves to reduce resonances of a hawser which are a cause for shocks. The frequency of the filter is varied corresponding to the hawser length, so that it is possible to compensate for possible resonances whose frequencies are influenced by the hawser length. The characteristic includes force limiting below the maximum load capacity of the hawser which is also stored in element 252 of FIG. 4.

The winch drive also has a force/length behavior of the winch that includes damping of resonance processes on the hawser as a function of the deployed hawser length. This is also stored in the element 252.

The winch speed during stowage produces a minimum incident-flow speed on the element on which the wind acts, which is sufficient to maintain its flying capability when loaded by the hawser. The wind speed is measured with an anemometer 111 (FIG. 3). The torque is measured by the torque measurement device 254 (FIG. 4). The signals from these devices are used in the control circuit to obtain a minimum incident-flow speed. A minimum force has to be applied to the kite-like element by the hawser in order to keep it flying and to avoid stall during stowage.

Means are provided in order to pull-in the kite when the wind speed is less than that required to maintain the flying capabilities when loaded by the hawser. A minimum force has to be applied to the kite-like element by the hawser in order to keep it flying and to avoid stall. As mentioned above, this is accomplished by measuring the wind speed with an anemometer 111 (FIG. 3). The torque is measured by the torque measurement device 254 (FIG. 4). The signals from these devices are used in the control circuit to actuate the motor and brake to pull-in the hawser when needed.

Means are provided in order to pull-in the element on which wind acts when there is a risk of a collision with an object under the water, in the water, on the land or in the air within a time period which is less than or equal to the time which is required for the element on which wind acts to be pulled in, as a minimum, at the maximum winch speed. The means include the user input 232 shown in FIG. 3 which is a part of the user interface 205 of FIG. 2. This is actuated manually if the risk of a collision is imminent. This risk of collision can be detected by vision control, radar or GPS with corresponding maps of the sea.

Means are provided in order to pull-in the element on which wind acts in advance when navigational restrictions prevent the guidance of the element on which wind acts. The crew of the ship can operate user input 232 also in advance of when navigational restrictions prevent the guidance of the element on which the wind acts.

Automatic control of the hawser when there is a risk of collision or navigational restrictions is also contemplated. The moving map 310 is coupled with element 300 which sends signals to the on-board system 200 (FIG. 3) and 210 (the system of the winch and hawser). Thus, if a risk of collision is detected by the moving map 310, the kite can be pulled in automatically. This is also true if there is a navigation restriction is indicated by the moving map 310 and navigation system 300 whereupon the hawser will be pulled in automatically.

The process of paying out the hawser includes paying out by a predetermined additional length amount that is in each case initiated when the minimum incident-flow speed has not been undershot within a predetermined time interval, or a weather signal is received or is determined which indicates an increased wind speed or a wind direction which will assist travel in the course direction, and this length is maintained provided that the hawser pull does not fall down when the additional hawser length is deployed. The control for this is provided by element 252 which contains the characteristics. In addition, the anemometer 111 can be used. If the crew gets information about changing weather conditions by radio, observation of an altimeter or barometer, or by other means, element 252 can be actuated. The weather information system from which information about the weather can be obtained is shown as element 600 in FIG. 2.

The pulling-in process and a paying-out process, particularly in a relatively high sea state, are carried out in such a manner that undesirable vessel movements in the hawser direction are reduced by a phase-shifted drive with respect to the hawser direction, in order to compensate for sea-state movements with respect to the element on which wind acts, or in that, with an appropriate phase-shifted drive, the sea-state movements of the vessel are reduced at the expense of the movement of the element on which wind acts. The sea-state detector 231 detects the movements of this ship due to the sea condition. The sea-state detector 231 is connected to the characteristic transmitter 252 to control the winch motor and brake.

With respect to details of individual elements of the exemplary embodiment, reference is also made to the co-pending patent applications submitted in parallel at the same time by the same applicant, U.S. patent application Ser. No. 11/578, 860, filed Oct. 19, 2006 for "Placement System for a Flying Kite-Type Wind-Attacked Element In A Wind-Powered Watercraft", and U.S. patent application Ser. No. 11/578,825 filed Oct. 19, 2006 for Watercraft Comprising A Free-Flying Kite-Type Wind-Attacked Element As A Wind-Powered Drive Unit.

The invention is not linked just to the described exemplary embodiments. Other configurations which are within the scope of the invention result from combinations of dependent claims, which will be evident to a person skilled in the art on the basis of the above description.

What is claimed:

1. A positioning apparatus for a freely flying kite-like element on which wind acts, having a wing profile as the exclusive propulsion system, as an auxiliary propulsion system or as an emergency propulsion system, which is connected via a hawser to a watercraft, characterized in that a winch is provided which has means which result in the hawser being pulled in if a first predetermined pulling force is undershot and/or in the event of imminent stall or if stall has occurred, and/or in the hawser being paid out if a second predetermined pulling force is exceeded and/or a predetermined incident-flow speed is exceeded.

2. The positioning apparatus as claimed in claim 1, characterized in that further means are provided which initiate a pulling-in or paying-out process only when the undershooting, overshooting or stall last for a predetermined time period which may if required be defined differently for each function direction.

3. The positioning apparatus as claimed in claim 1, characterized in that the means are designed in such a manner that the output signal from a sensor for imminent stall or for stall which has already occurred is supplied to a converter which drives the winch in order to shorten the hawser in such a manner that the incident flow on the element on which wind acts is increased to such an extent that the lift of the element on which wind acts is sufficient in order to at least keep it in the air.

4. The positioning apparatus as claimed in claim 1, characterized in that the means are designed in such a manner that, when the incident flow exceeds a predetermined value, the length of the hawser is increased successively again until it has reached essentially the same length as before it was shortened.

5. The positioning apparatus as claimed in claim 1, characterized in that said means includes a winch drive that has a predetermined torque/hawser-length characteristic which is always formed with a predetermined delay time constant in the region of the currently deployed hawser length, so that hawser shocks are absorbed.

6. The positioning apparatus as claimed in claim 5, characterized in that the characteristic includes force limiting below the maximum load capacity of the hawser.

7. The positioning apparatus as claimed in claim 1, characterized in that said means includes a winch drive that provides a force/length behavior of the winch that includes damping of resonance processes on the hawser as a function of the deployed cable length.

8. The positioning apparatus as claimed in claim 1, characterized in that the winch speed during stowage produces a minimum incident-flow speed on the element on which wind acts, which is sufficient to maintain its flying capability when loaded by the hawser.

9. The positioning apparatus as claimed in claim 1, characterized in that means are provided in order to pull in the element on which wind acts when the wind speed is less than is required to maintain its flying capability when loaded by the hawser.

10. The positioning apparatus as claimed in claim 1, characterized in that means are provided in order to pull in the element on which wind acts when there is a risk of a collision with an object under the water, in the water, on the land or in the air within a time period which is less than or equal to the time which is required for the element on which wind acts to be pulled in, as a minimum, at the maximum winch speed.

11. The positioning apparatus as claimed in claim 1, characterized in that means are provided in order to pull in the element on which wind acts in advance when navigational restrictions prevent the guidance of the element on which wind acts.

12. The positioning apparatus as claimed in claim 1, characterized in that the process of paying out the hawser includes paying out by a predetermined additional length amount that is in each case initiated when the minimum incident-flow speed has not been undershot within a predetermined time interval, or a weather signal is received or is determined which indicates an increased wind speed or a wind direction which will assist travel in the course direction, and this length is maintained provided that the hawser pull does not fall down when the additional hawser length is deployed.

13. The positioning apparatus as claimed in claim 1, characterized in that a pulling-in process and a paying-out process, particularly in a relatively high sea state, are carried out in such a manner that undesirable vessel movements in the hawser direction are reduced by a phase-shifted drive with respect to the hawser direction, in order to compensate for sea-state movements with respect to the element on which wind acts, or in that, with an appropriate phase-shifted drive, the sea-state movements of the vessel are reduced at the expense of the movement of the element on which wind acts.

14. The positioning apparatus as claimed in claim 1, characterized in that the winch is driven by a pressure medium.

15. The positioning apparatus as claimed in claim 1, characterized in that the winch drive is in the form of a variable-volume hydraulic pump.

16. The positioning apparatus as claimed in claim 1, characterized in that an emergency set is provided which ensures that the power required to operate the winch is available even if the primary energy source fails.

17. A watercraft having a positioning apparatus as claimed in claim 1, characterized in that a generator is provided in order to obtain energy, which is driven by the flow of the water outside the watercraft and supplies the electrical energy that is generated to an energy store.

18. The positioning apparatus as claimed in claim 2, characterized in that the means are designed in such a manner that the output signal from a sensor for imminent stall or for stall which has already occurred is supplied to a converter which drives the winch in order to shorten the hawser in such a manner that the incident flow on the element on which wind acts is increased to such an extent that the lift of the element on which wind acts is sufficient in order to at least keep it in the air.

19. The positioning apparatus as claimed in claim 2, characterized in that the means are designed in such a manner that, when the incident flow exceeds a predetermined value, the length of the hawser is increased successively again until it has reached essentially the same length as before it was shortened.

20. The positioning apparatus as claimed in claim 3, characterized in that the means are designed in such a manner that, when the incident flow exceeds a predetermined value, the length of the hawser is increased successively again until it has reached essentially the same length as before it was shortened.

* * * * *